United States Patent [19]

Swenson et al.

[11] Patent Number: 4,839,117
[45] Date of Patent: Jun. 13, 1989

[54] METHOD AND APPARATUS FOR FORMING A COMPOSITE FOAM SHELL AND INSERT ARTICLE

[75] Inventors: Harold W. Swenson, Dover, N.H.; Ken E. Tuttle, South Berwick, Me.

[73] Assignee: Davidson Textron Inc., Dover, N.H.

[21] Appl. No.: 152,961

[22] Filed: Feb. 8, 1988

[51] Int. Cl.[4] ..................... B29C 67/22; B29C 39/12
[52] U.S. Cl. .............................. 264/46.4; 264/46.5; 264/46.6; 264/101; 264/261; 269/21; 294/64.1; 425/126.1; 425/817 R
[58] Field of Search .................. 264/46.4, 46.6, 46.5, 264/101, 261; 294/65, 64.1; 269/21; 425/126.1, 817 R

[56] References Cited

U.S. PATENT DOCUMENTS

| | | | |
|---|---|---|---|
| 2,745,665 | 5/1956 | Labombarde | 269/21 X |
| 2,955,972 | 10/1960 | Wintermute et al. | 264/46.8 X |
| 2,976,577 | 3/1961 | Gould | 264/46.6 |
| 3,147,324 | 9/1964 | Ward | 264/101 X |
| 3,410,931 | 11/1968 | Johnson | 425/126.1 X |
| 3,415,388 | 12/1968 | Hörnlein et al. | 425/126.1 X |
| 3,712,771 | 1/1973 | White et al. | 425/126.1 |
| 3,878,279 | 4/1975 | Sorrells et al. | 264/101 X |
| 3,901,502 | 8/1975 | Vits | 294/64.1 X |
| 3,934,916 | 1/1976 | Baker | 294/65 X |
| 3,970,732 | 7/1976 | Slaats et al. | 264/101 X |
| 4,259,274 | 3/1981 | Tiitola | 264/46.5 |
| 4,389,177 | 6/1983 | Colby | 425/144 |
| 4,420,447 | 12/1983 | Nakashima | 264/46.8 X |
| 4,542,887 | 9/1985 | Bethell et al. | 264/46.8 X |
| 4,571,320 | 2/1986 | Walker | 294/65 X |
| 4,623,503 | 11/1986 | Anestis et al. | 264/302 |
| 4,662,668 | 5/1987 | Hufford | 294/64.1 |
| 4,684,113 | 8/1987 | Douglas et al. | 269/21 |
| 4,700,488 | 10/1987 | Curti | 269/21 X |
| 4,734,230 | 3/1988 | Rhodes, Jr. et al. | 264/46.6 X |

FOREIGN PATENT DOCUMENTS

| | | | |
|---|---|---|---|
| 3500342 | 7/1986 | Fed. Rep. of Germany | 294/64.1 |
| 56-93525 | 7/1981 | Japan | 264/46.8 |
| 58-57927 | 4/1983 | Japan | 264/46.5 |
| 59-189890 | 10/1984 | Japan | 264/46.6 |
| 60-49905 | 3/1985 | Japan | 264/46.6 |
| 61-95909 | 5/1986 | Japan | 264/46.6 |
| 61-116510 | 6/1986 | Japan | 264/46.6 |
| 2000717 | 1/1979 | United Kingdom | 264/46.5 |

OTHER PUBLICATIONS

*Roget's Pocket Thesaurus*, Based on Roget's International Thesaurus of English Words and Phrases, Edited by C. O. Sylvester Mawson; Assisted by Katharine Aldrich Whiting, New York, Pocket Books, Inc., [Jun. 1964], (A Cardinal Edition) pp. 26, 79, 256, 313, 370.

*Roget's International Thesauris*, Third Edition, New York, Thomas Y. Crowell Co., ©1962, pp. 37, 38, 42, 369, 370, 517, 672, 931.

*The Random House College Dictionary*, Revised Edition, Based on the Random House Dictionary of the English Language, the Unabridged Edition, Jess Stein , Editor in Chief, New York, Random House, Inc., ©1982, pp. 34, 676, 677.

Primary Examiner—Philip Anderson
Attorney, Agent, or Firm—John C. Evans

[57] ABSTRACT

A pour mold includes two parts one of which forms a mold cavity and the other of which forms the lid for the mold cavity; the lid includes a retractable pilot pin and vacuum cups for positioning a mold insert within the mold cavity automatically upon lid closure. The pilot pin loosely pilots the insert in the mold as it closes and as the vacuum cups pull the insert toward the lid during such closure. The vacuum cups hold the insert against the lid continuously during foam injection, foam reaction and cure and as the lid is separated from the mold cavity part so as to automatically remove the finished part from the mold when the lid is separated therefrom.

22 Claims, 4 Drawing Sheets

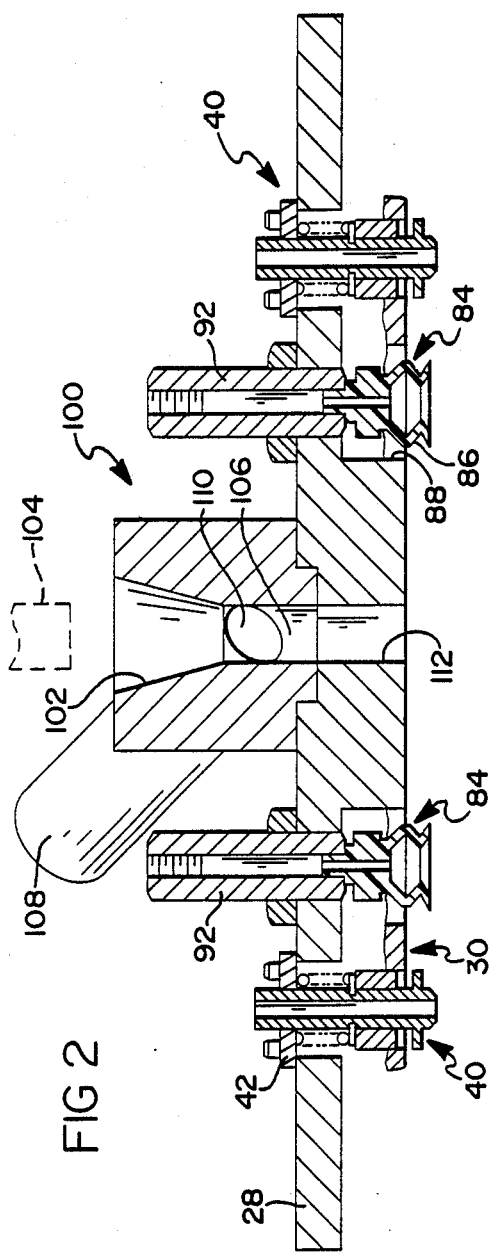
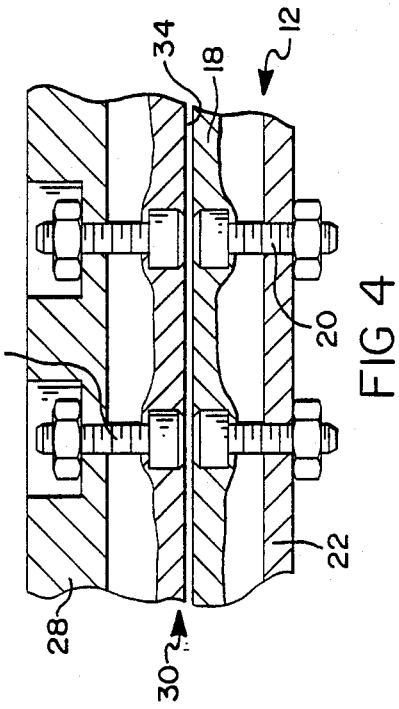

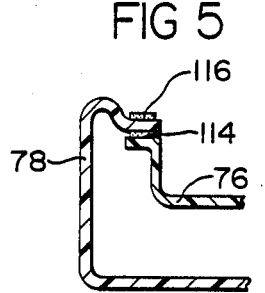
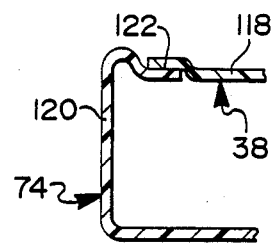
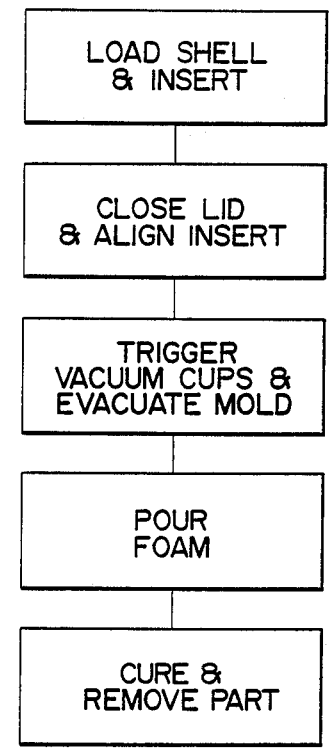

METHOD AND APPARATUS FOR FORMING A COMPOSITE FOAM SHELL AND INSERT ARTICLE

FIELD OF THE INVENTION

This invention relates to mold apparatus and to methods for molding composite plastic parts having a shell and an insert and more particularly to mold apparatus for automatically positioning an insert with respect to the mold apparatus as a lid component is closed.

BACKGROUND OF THE INVENTION

Various proposals have been suggested for preloading a mold insert on a lid of multi-part mold apparatus so that the insert will be disposed in a mold cavity wherein foam precursors are poured and reacted to fill the mold cavity and to bond to the insert such that the insert will be formed integrally of a finished composite part.

It is known to manually locate a steel insert on a lid by use of magnets carried on the lid. Such an arrangement requires preloading of the insert on the lid prior to closure and requires that the insert be manually separated from the magnets during off loading of the part.

It is also known to manually press and load a surface plate for a composite structure against a rigid wall of a mold having vacuum ports in the wall to fix the surface plate to the wall during a plastic molding process.

While such apparatus is suitable for its intended purpose it does not provide an arrangement in which an insert can be preloaded into a mold cavity part and then automatically spaced in the mold cavity as a lid part is closed.

Furthermore, such apparatus does not provide for initial piloting of the insert as it is pulled into alignment with the lid as it is closed with respect to a mold cavity part.

One feature of the present invention is to provide a two part pour mold apparatus including means for automatically positioning a preloaded insert against and laterally with respect to a lid following closure of the mold.

Another feature of the present invention is to provide a two part pour mold apparatus having piloting means on the lid which will initially pilot a preloaded insert against and with respect to a lid as the lid is closed and which will retract when the insert is positioned against the lid.

One aspect of the invention is to provide electroformed surfaces with a stud mounting configuration that provides better dependability for repeatable location of an insert with respect to lid and shell cavity parts of a pour mold apparatus; and further, to provide an electroform material also more suitable for use with known mold release coatings such as Teflon.

Still another feature of the present invention is to provide a two part mold apparatus which will reduce the time required to index and position an insert within a mold cavity during automatic pour molding of composite plastic parts.

Still another object of the present invention is to improve pour mold apparatus having a mold cavity part and a lid moveable with respect to a cavity part having a preloaded insert therein and wherein mixhead means are provided to direct foam precursors into the mold cavity to react within a space formed between the shell and insert such improvement comprising: means forming a lid having a cover thereon; piloting means on the lid for aligning the insert in a first relationship with respect thereto; and means forming a plurality of collapsible vacuum cups on the lid; the collapsible vacuum cups being engageable with the piloted insert for positioning the insert in a desired spaced relationship within the mold cavity during fill and reaction of foam precursors.

Still another object of the present invention is to provide apparatus as set-forth in the preceding object wherein means are provided for directing vacuum to the vacuum cups to pick up the insert and hold it with respect to the closed lid thereby to maintain the desired spaced relationship during foam fill; and wherein means are also provided for maintaining vacuum on the vacuum cups following cure of the foam whereby the finished part is lifted and off loaded from the cavity part by the engagement between the insert and the vacuum cups in response to opening movement of the lid with respect to said mold cavity part.

Yet another object of the present invention is to provide an improved method for forming a composite plastic part having a insert therein bonded to reacted foam precursors poured into a mold cavity part comprising the steps of preloading a shell and insert into the mold cavity with the shell conforming to the mold cavity and the insert being loosely disposed in the shell; piloting the loosely disposed insert with respect to a mold lid as it is being closed with respect to the mold cavity and simultaneously attracting the insert against the lid to form a foam cavity into which foam precursors are poured for reaction and bonding to both the shell and the insert.

Still another object of the present invention is to provide a method of the preceding object wherein the piloting is accompanied by evacuation of the space which is formed as the insert is attracted against the mold lid.

SUMMARY OF THE INVENTION

In accordance with a preferred embodiment of the present invention a two part pour mold assembly includes a mold cavity part and a closure in the form of a moveable lid having a cover thereon. The cavity part is adapted to receive a preformed insert or a preformed insert/shell combination. The closure has a spring controlled locator pin that serves to pilot the preloaded insert with respect to the lid as it is closed. The closure further includes collapsible vacuum cups which automatically pick up the insert after the lid is closed. Vacuum lines are provided to evacuate air from inside the shell prior to a foam pour or shot.

The apparatus also includes a mixhead and a sealed pour hole for directing foam precursors into a space between the shell and the insert when the insert has been positioned automatically with respect to the lid by the vacuum cups.

The process of the following invention includes the steps of:
  1. Spray or predeposit a mold release on the lid.
  2. Preload shell and insert into a mold cavity part.
  3. Close lid.
  4. Pilot the insert with respect to the lid by directing insert locating pins into insert locating holes.
  5. Lift insert by expansible vacuum cups and retract locating pins to trigger internal mold vacuum and the foam shot.

6. Close pour hole plug.

7. Cure part, open mold and unload the part by opening the lid and selectively activating the vacuum cups to lift and release the part.

DESCRIPTION OF THE DRAWINGS

These and other objects, features and advantages of the invention will become apparent upon consideration of the specification and appended drawings wherein:

FIG. 2 is an enlarged cross-sectional view taken along the line 2—2 of FIG. 1 looking in the direction of the arrows;

FIG. 4 is an enlarged fragmentary sectional view taken along the line 4—4 of FIG. 1;

FIG. 5 is an enlarged fragmentary sectional view of a first seal configuration between a shell and an insert used in conjunction with the present invention;

FIG. 6 is an enlarged fragmentary sectional view of a second seal configuration between a shell and an insert used in conjunction with the present invention; and FIG. 7 is a chart showing the a method for making composite plastic parts in accordance with the present invention.

DESCRIPTION OF THE PREFERRED EMBODIMENT

Figure 1:
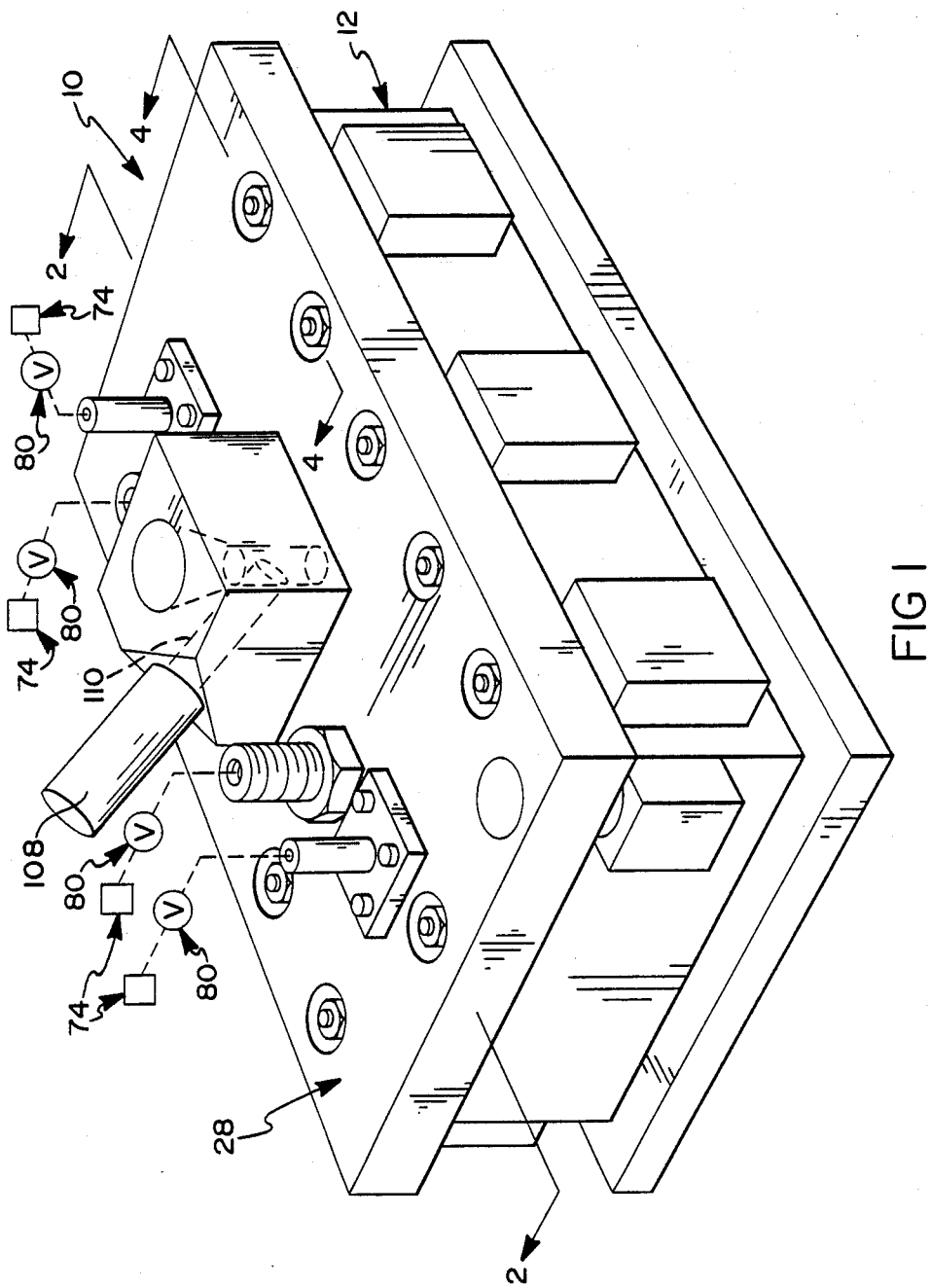
FIG. 1 is a view in perspective of pour mold apparatus including the present invention.

Referring now to FIG. 1, a pour mold apparatus 10 is illustrated including a frame 12 which supports a mold cavity part 14.

According to the present invention the mold cavity part 14 is made of nickel material and is formed by electroforming a layer of material against a replica of the part to be molded against the resultant cavity surface 16. The mold cavity part 14 has a peripheral extent thereon which forms a flange 18 on the mold cavity part. It has a plurality of shoulder bolts 20 directed therethrough into threaded engagement with a nut 21 to secure the cavity part 14 to the frame 12 at an inboard directed flange 22 thereon.

The outer surface 24 of the mold cavity part 14 has a plurality of tubes 26 brazed thereto which are adapted to be selectively connected to suitable sources of heated and cooled liquid of the type set-forth in U.S. Pat. No. 4,389,177, issued June 21, 1983. Flow of fluid through the tubes 26 selectively heats and cools the cavity part 14 during a process to be described. The tubes and the method of flow therethrough form no part of the present invention and could be replaced by other suitable heating and cooling systems including the gas heating and cooling system of U.S. Pat. No. 4,623,503, issued Nov. 11, 1986.

The pour mold apparatus 10 further includes an aluminum cover plate 28 which overlies the full perimetric extent of the mold cavity part 14. The cover plate 28 carries a nickel electroform lid 30 which is secured to the cover plate 28 by a plurality of shoulder bolts 32 and nuts 33. The smooth replicated surface 34 on the electroform has a plug segment 36 thereon which serves to guide insert 38 with respect to the lid 30 when the pour mold apparatus 10 is closed.

One aspect of the invention is that the electroform surfaces 16 and 34 are more accurate than cast aluminum pour mold parts. The stud mounting configuration provides better dependability for repeatable location of an insert with respect to lid and shell cavity parts of a pour mold apparatus. The nickel electroform material is also more suitable for use with known mold release coatings such as Teflon.

In accordance with another aspect of the present invention the cover plate includes a pair of spaced locator pin assemblies 40 which are adapted to further pilot and position the insert 38 automatically as the mold apparatus is closed.

Figure 3:
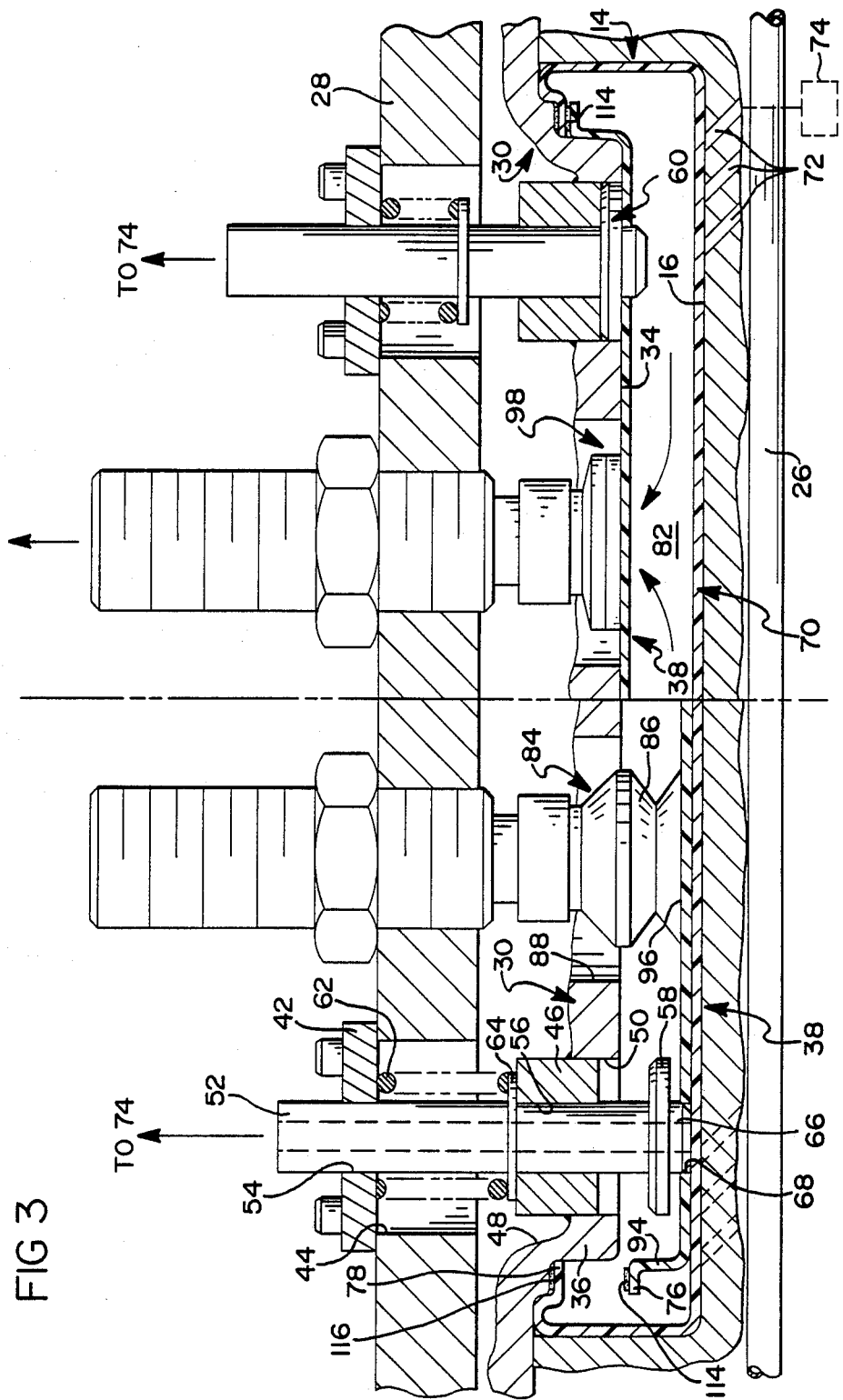
FIG. 3 is an enlarged fragmentary cross-sectional view of vacuum cup and locator pin components of the present invention in an a pick up position and in a retracted/lift position.

Each of the locator pin assemblies 40, as best seen in FIG. 3, includes a guide plate 42 carried on the cover plate 28 at an opening 44 therein and it further includes a bushing 46 connected to the inner surface 48 of the lid 30 at an opening 50 therethrough.

A locator pin 52 is slip fit through guide holes 54, 56 formed respectively in the plate 42 and the bushing 46. The inboard end of the pin 52 has a large diameter head 58 formed to fit the opening 50 in the electroform lid 30. The head 58 serves to locate the pin 52 in a retracted position in the cover 28 as shown at 60 on the right hand operative position of FIG. 3.

The pin 52 is spring biased by a spring 62 which surrounds the pin 52 at the cover 28 so as to be compressed between the guide plate 42 and a snap ring 64 secured to the pin 52. The spring 62 biases the pin 52 to an extended position with respect to the cover plate 28 when it is open. Consequently, as the cover plate 28 closes a small pilot tip 66 on the pin 52 will enter a pilot hole 68 on the insert 38 to further align the insert 38 within the mold cavity part 14 and with respect to a shell 70. The shell 70 may be formed of a suitable interior trim material such as polyvinylchloride (PVC) which will securely bond to foam precursors which react to form a foam core between the insert 38 and the shell 70.

The insert 38 and shell 70 are automatically placed into the cavity part 14 when the mold is initially opened. Vacuum holes 72 are provided in the cavity part 14 and vacuum is applied from a source 74 to hold the shell 70 against the cavity part 14 once the insert 38 and shell 70 are so loaded. At this stage the insert 38 is positioned on the bottom of the shell 70 as best seen on the left of FIG. 3.

The aforesaid piloting action positions the peripheral flange 76 of the insert 38 at a desired location with respect to the mating flange 78 of shell 70.

Another feature of the present invention is that the pin 52 has a passage 79 formed therethrough. The passage 79 is selectively communicated with the source of vacuum 74 at one end thereof by control valve means 80. The opposite end of the passage 79 is communicated with an interior space 82 when the mold apparatus 10 is closed (as shown on the right hand side of FIG. 3) and will provide internal control of atmospheric pressure by maintaining a vacuum on the mold during a pour step wherein foam precursors are directed into the mold. Use of vacuum to control atmospheric pressure eliminates the need for an operator to punch holes in the shell 74 and insert 38 to minimize void formations due to entrapment of air in the mold A further feature of the apparatus of the present invention is that the automatic evacuation of the mold space through the locator pins 52 is accompanied by an automatic positioning of the insert 38 with respect to the shell 74. Specifically, as best shown in FIGS. 4–6 the lid 30 has a pair of spaced collapsible vacuum cups 84 therein which include a pre-pilot position in FIG. 4 in which convolutions 86 of the vacuum cups 84 are extended beyond a recess 88 in the lid 30. The vacuum cups 84 have an inlet neck 90 connected by a nipple 92 to the vacuum source 74.

When the lid 30 is aligned with the recess 94 in the insert 38 the pilot holes 68 will be engaged by the pilot tip 66 (FIG. 3, left side) and as the lid 30 closes the tip 66 will produce desired lateral alignment of the insert 38 in the mold. The vacuum cups 84 are communicated with the vacuum source 74. The expanded cups will act on the surface 96 of the loosely loaded insert 38 and when the vacuum is applied the cups 84 will collapse to pull the inset 38 upwardly toward the lid 30 until it is fully supported by the lid 30 and laterally positioned by the pins 52 as shown by the reference numeral 98 (FIG. 3, right side). As this occurs the lid 30 is fully closed and the supported shell 70 and insert 38 are ready for foaming.

The fill system 100, (FIG. 2), includes a locating plate having a tapered pour hole fitting 102 thereon which is adapted to be communicated with a mixhead 104 actuatable to direct foam precursors through the pour hole fitting 102 into the mold space 82 for reaction therein. When the foam material has been injected into the space 82 a plug 106 is actuated by an actuator 108 to shift downwardly in an inclined bore 110 to intersect and close the outlet passage 112 from the fitting 102. Such pour hole shut-off contains vacuum in the space 82 and foaming can take place without formation of undesirable voids.

During the foaming process the closely aligned flange 76 and flange 78 locate a preformed seal gasket 114, as shown in FIG. 5, on the insert 38 so as to seal the insert 38 to the shell 70 as the vacuum cups 84 pull upwardly on the insert 38. A knife edge seal 116 on the flange 72 is engaged by the closed lid 30 to provide controlled venting of the mold apparatus 10.

In another embodiment shown in FIG. 6, the insert 38 has a reversely fold flange 118 which overlies the flange 120 of the shell 74. In this arrangement the joint space 122 will have foam directed therein during the foaming process to define a foam pressure seal.

In both the embodiment of FIG. 5 and the embodiment of FIG. 6 the final product will have a outer shell and insert with a foamed interior. The foamed parts, because of the control of atmospheric pressure and the arrangement of the shell/insert flanges completely traps the foam so that there is no need to strip foam scrap form the finished part.

The method of the present invention shown in FIG. 7 is fully automated and includes the steps of loosely loading a shell and insert component in a mold cavity part; applying vacuum to the cavity and close the mold lid; aligning the insert with respect to pilot pins during lid closure; triggering the vacuum cups in response to the pilot action and picking-up the insert to hold it against the lid and to seal shell and insert flanges; simultaneously, controlling internal atmospheric pressure by applying vacuum to the interior of the shell and lid during a foam shot through a pour hole and plugging the pour hole to maintain the internal vacuum during foaming. Thereafter curing the part and automatically removing it from the mold cavity by use of the vacuum cups. Vacuum is maintained on the vacuum cups after the foam is cured so that they can be used to extract the finished part from the mold cavity part 14. In particular, the resultant engagement between the evacuated vacuum cups 84 and the insert 38 will hold the finished part to the lid 30 so that the finished part will be lifted from the mold cavity part 14 when the lid 30 is opened.

The aforedescribed apparatus and method enables multi-component systems to be automatically processed without manual loading and alignment of the component parts or without manual unloading or stripping of the finished part.

It will be appreciated by those skilled in the art that the present invention is not limited to the precise embodiments of apparatus or methods disclosed. For example, the use of brazed tubes for heating and cooling could be replaced by other heating and cooling systems. While PVC shells are discussed, other shell types are equally suited for practicing the invention. While collapsible diaphragm vacuum cups are shown other suitable extendible lift means would be equally suited to engage and lift an insert upon application of vacuum thereto.

Various changes in the apparatus configuration, product shape and methods could also be made to meet the design objectives of form fit and function attendant to a particular part to be manufactured by the apparatus and method of this invention.

What is claimed is:

1. In a method for manufacturing a composite product having a first member in the form of an outer shell and a second member forming a spaced outer surface on the composite product and wherein a layer of foamed material is formed in-situ between the outer shell and the second member the improvement comprising:
   providing a peripheral flange on the first member;
   providing a pour mold assembly having a mold cavity part and a lid moveable with respect to the cavity part to open the mold cavity part for loading a first member onto the cavity part;
   providing locating means on said lid including a hollow pilot pin adapted to engage the second member only as the lid is closed against the mold cavity part to laterally position the second member with respect to the first member;
   lifting the second member with respect to the lid to locate the second member in sealing engagement with the flange of the first member;
   initiating lift of the insert once the second member is laterally positioned with respect to the first member to cause the second member to be automatically moved into sealed engagement with the flange of the second member while forming a space between the second member and the first member;
   directing foam precursors into the space for reaction therein while simultaneously withdrawing air from the space through the hollow pilot pin to prevent air entrainment in the foam precursors during formation of the layer of foamed material bonded in situ to the first and second members; and
   continuing to lift the second member following curing of the foamed layer and as the lid is opened from the mold cavity part to cause the composite part to be automatically released from the mold cavity part solely in response to lid opening movement.

2. In the method of claim 1, lifting the aligned insert by applying vacuum thereagainst.

3. In the method of claim 1, lifting the aligned insert by use of collapsible vacuum cups to apply vacuum on the insert.

4. In the method of claim 1, forming the flanged shell to underlie the perimeter of the insert whereby the foamed in-situ core will produce a foam seal between the flange of the shell and the perimeter of the insert.

5. In the method of claim 2, forming the flanged shell to underlie the perimeter of the insert whereby the foamed in-situ core will produce a foam seal between the flange of the shell and the perimeter of the insert.

6. In the method of claim 1, controlling atmospheric pressure between the spaced shell and insert by drawing air through a hollow pin used to align the insert with respect to the shell.

7. In the method of claim 2, controlling atmospheric pressure between the spaced shell and insert by drawing air through a hollow pin used to align the insert with respect to the shell.

8. In the method of claim 1, forming a gasket on the insert for sealing engagement with the flange of the shell to seal the space therebetween.

9. In the method of claim 8, controlling atmospheric pressure between the spaced shell and insert by drawing air through a hollow pin used to align the insert with respect to the shell.

10. In the method of claim 2, forming a gasket on the insert for sealing engagement with the flange of the shell to seal the space therebetween.

11. In a pour mold assembly having a mold cavity part and a lid moveable with respect to the mold cavity part to open the mold cavity part for loading a shell onto the cavity part and wherein the shell has an insert loosely supported thereon for movement with respect to the shell and which is positioned with respect to the shell when the lid is closed to form a space between the shell and the insert in which foam precursors can be reacted when the lid is closed and wherein the insert includes an inner surface and an outer surface and the shell includes an inner surface and an outer surface the improvement comprising:
a lid moveable with respect to the mold cavity part to open and close the mold cavity part;
insert locating means on said lid;
said insert locating means including a pilot pin adapted to engage said insert as said lid is closed against the mold cavity part to laterally position the insert with respect to the shell;
said insert locating means further including vacuum cup means with an extended length when said vacuum cup means is at atmospheric pressure and which collapses to define a retracted length when said vacuum cup means is evacuated;
said vacuum cup means engaging the outer surface of the insert when in its extended length as said pilot pin is laterally locating the insert with respect t the shell;
vacuum control means for applying a vacuum on the vacuum cup means when said insert has been laterally positioned with respect to the shell for causing said vacuum cup means to assume its retracted length to thereby lift the insert from the shell to form a space therebetween; and
means for moving said pilot pin as the insert is lifted from the shell to accommodate movement of the insert away from the shell.

12. In the combination of claim 11, said pilot pin being a hollow pin; and means operatively connected to said hollow pin for controlling atmospheric pressure between said insert and said shell during foam injection by drawing air therefrom through said hollow pin.

13. In a pour mold assembly having a mold cavity part and a lid moveable with respect to the mold cavity part to open the mold cavity part for loading a shell onto the mold cavity part and wherein the shell has an insert loosely supported thereon for movement with respect to the shell and which is positionable with respect to the shell when the lid is closed to form a space between the shell and the insert in which foam precursors can be reacted when the lid is closed and wherein the insert includes an inner surface and an outer surface and the shell includes an inner surface and an outer surface the improvement comprising:
means forming a lid moveable to open and close the mold cavity part;
insert locating means;
a cover supporting said insert locating means for movement with respect to said lid and means for connecting said cover to said lid for replacing said lid on said cover without removing said insert locating means therefrom;
said insert locating means including a pilot pin adapted to engage an insert as said lid is closed against the mold cavity part so as to laterally position the insert with respect to the shell;
said insert locating means further including vacuum cup means with an extended length when said vacuum cup means is at atmospheric pressure and a retracted length when said vacuum cup means is evacuated;
said vacuum cup means engaging the outer surface of the insert when in its extended length as said pilot pin is laterally locating the insert with respect to the shell;
vacuum control means for applying a vacuum on the vacuum cup means when said insert has been laterally positioned with respect to the shell for causing said vacuum cup means to assume its retracted length to thereby lift the insert from the shell to form a space therebetween; and
means for moving the pilot pin as the insert is lifted from the shell to accommodate movement of the insert away from the shell.

14. In the pour mold assembly of claim 11,
said vacuum control means for directing vacuum to said vacuum cup means including means operative to continue to maintain vacuum on said vacuum cup means during injection of foam precursors into the space previously formed between the insert and the shell by lifting the insert from the shell by use of the initially evacuated vacuum cup means and including means operative to maintain a vacuum level on the vacuum cup means to maintain a pull force on the outer surface of the insert following curing of the foam into bonded relationship with the inner surface of the insert and curing of the foam into bonded relationship with the inner surface of the shell to produce a resultant force on the insert which will automatically separate the insert, a layer of foam material bonded thereto and to the shell as a finished part from the mold cavity in response to opening movement of the lid with respect to the mold cavity part.

15. In a mold assembly for forming a composite part including a first member, a second member in the form of a soft exterior shell and a layer of foam material located between the first member and the soft exterior shell and bonded in situ therewith and wherein the shell has an inner surface and an outer surface, the outer surface being initially supported on the interior surface of a mold cavity part and the first member being initially carried on the inner surface of the shell prior to injecting foam precursors into the mold assembly the improvement comprising:

a mold cavity part and a lid to close said mold cavity part each including a thin layer of metal having a surface thereon corresponding to the outer surface profile of the composite part to be formed therein;

positioning means for positioning the first member laterally with respect to the shell;

a cover removeably connected to said lid including means for supporting said positioning means for movement with respect to the first member when the lid is closed against said mold cavity part;

automatic lift means on said cover operative following lateral alignment of the first member with the shell to pick the first member and lift it from the shell to form a space therebetween and to further position the first member in engagement with the lid when the lid is closed against the mold cavity part;

and control means for maintaining a lift force on the first member during foam fill, foam cure and when the composite part is released from the mold assembly whereby the composite part is automatically released from the mold assembly when the lid is opened.

16. In the mold assembly of claim 12, means forming a pilot hole in an insert, said pilot pin being a hollow pin having an outer surface and an outlet;

spring means engageable with said hollow pin adapted to bias said hollow pin into said pilot hole to locate said outlet in communication with the inner surface of the insert for withdrawing air from the space formed between the insert and the shell when the insert is lifted from the shell;

said spring means responsive to lifting of said insert from the shell to permit movement of said insert into engagement with said lid;

said guide means including a plate and a bushing spaced from said plate each engaging said outer surface of said hollow pin at spaced locations thereon as the insert is lifted against said lid.

17. In a mold assembly for forming composite parts including a first member, a second member in the form of an outer shell and a layer of foam material sandwiched between the first member and the outer shell and bonded thereto and wherein the shell is initially carried by a mold cavity part of the mold assembly and the first member is carried by a mold lid during formation of the foam material layer the improvement comprising:

means defining a first thin metal member on the mold cavity part;

means defining a second thin metal member on the lid;

each of said first and second thin metal members including flange means thereon with connection bolts formed in situ of said flange means;

cover means removably connected to connection bolts formed in situ of said flange means on first thin metal member;

frame means removably connected to connection bolts formed in situ of said flange on said second thin metal member;

positioning means on said cover means for piloting the first member laterally with respect to the shell and adapted to remain in place on said cover means during replacement of said first thin metal member thereon; and automatic lift means operative following lateral positioning of the insert with respect to the shell for lifting the insert from the shell and holding it against the lid during reaction of foam precursors.

18. In the combination of claim 17, said automatic lift means including vacuum cup means having one end thereof engageable with the insert and including the opposite end thereof adapted to be selectively connected to a source of vacuum to hold the insert against the lid continuously during foam injection, foam cure and removal of the completed part following foam cure.

19. In the combination of claim 17, means forming an insert locating pin on said lid selectively engageable with an insert located within said mold cavity part to index the insert with respect thereto;

means operative to evacuate the space between the insert and the shell prior to foam injection therebetween;

and means for maintaining a vacuum force on the insert during foam injection to maintain a desired spatial relationship between the shell and the insert during reaction of foam precursors in the mold.

20. In the combination of claim 19, said insert locating pin being a hollow pin; and means operatively connected to said hollow pin for controlling atmospheric pressure between said insert and said shell during foam injection by drawing air therefrom through said hollow pin.

21. In the combination of claim 20, means for spring biasing the hollow pin against the insert at a locating hole therein to align the outlet of the hollow pin with the interior space between the insert and the shell;

and means for guiding said pin with respect to the lid and against the spring biasing force to provide for lift movement of the insert with respect to the closed lid relative to the shell when it is supported by the cavity mold part.

22. In a pour mold assembly having a mold cavity part and a lid moveable with respect to the mold cavity part to open the mold cavity part for loading a shell onto the cavity part and wherein the shell has an insert loosely supported thereon for movement with respect to the shell and which is moveable with respect to the shell when the lid is closed to form a space between the shell and the insert which foam precursors can be injected when the lid is closed and wherein the insert includes an inner surface and an outer surface the improvement comprising:

a lid moveable with respect to the mold cavity part and having an inner surface positioned to open and close the mold cavity part;

insert locating means on said lid;

said insert locating means including a pilot pin adapted to engage an insert as said lid is closed against the mold cavity part to laterally position the insert with respect to the shell;

automatic lift means on said lid operative following lateral alignment of the insert to pick the insert and lift it with respect to the shell to form a space therebetween and to further position the insert in engagement with said inner surface of the lid when the lid is closed against the mold cavity part; and control means for maintaining a lift force on the insert during foam fill, foam cure and when the composite part is released from the mold assembly whereby the composite part is automatically released from the mold assembly when the lid is opened.

* * * * *